United States Patent
Bergeal et al.

(10) Patent No.: US 9,140,167 B2
(45) Date of Patent: Sep. 22, 2015

(54) OXIDATION CATALYST FOR A LEAN BURN INTERNAL COMBUSTION ENGINE

(75) Inventors: David Bergeal, Ware (GB); Andrew Francis Chiffey, Ware (GB); Marie Feuerstein, Royston (GB); Paul Richard Phillips, Royston (GB); Wolfgang Strehlau, Sulzbach (DE); Daniel Swallow, Sandy (GB); James Wylie, Royston (GB)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 13/996,575

(22) PCT Filed: Dec. 21, 2011

(86) PCT No.: PCT/GB2011/052547
§ 371 (c)(1),
(2), (4) Date: Sep. 11, 2013

(87) PCT Pub. No.: WO2012/085572
PCT Pub. Date: Jun. 28, 2012

(65) Prior Publication Data
US 2013/0340414 A1    Dec. 26, 2013

Related U.S. Application Data

(60) Provisional application No. 61/425,464, filed on Dec. 21, 2010.

(30) Foreign Application Priority Data

Dec. 23, 2010  (GB) .................................. 1021887.3

(51) Int. Cl.
*F01N 3/00*  (2006.01)
*F01N 3/28*  (2006.01)
(Continued)

(52) U.S. Cl.
CPC ............ *F01N 3/2803* (2013.01); *B01D 53/944* (2013.01); *B01D 53/96* (2013.01);
(Continued)

(58) Field of Classification Search
CPC ............ B01J 23/40; B01J 23/63; B01J 23/96; B01J 37/0244; B01J 37/0246; B01D 53/944; B01D 53/9477; B01D 53/96; B01D 2255/2065; B01D 2255/1021; B01D 2255/2073; B01D 2255/20746; B01D 2255/20738; B01D 2255/20761; B01D 2255/2094; F01N 3/2803
USPC .................................... 60/285, 297, 301, 311
See application file for complete search history.

(56) References Cited

U.S. PATENT DOCUMENTS 5,286,699 A    2/1994  Ohata et al.
5,473,887 A    12/1995 Takeshima et al.
(Continued)

FOREIGN PATENT DOCUMENTS

DE    10308288 A1    9/2004
EP    0341832 A2    11/1989
(Continued)

OTHER PUBLICATIONS

Golunski, S.E et al., "Origins of Low-Temperature Three-Way Activity in Pt/CeO2," Applied Catalysis B: Environmental 5, 1995, pp. 367-376.
(Continued)

*Primary Examiner* — Thomas Denion
*Assistant Examiner* — Diem Tran
(74) *Attorney, Agent, or Firm* — Kevin M. Carroll

(57) ABSTRACT

An apparatus is disclosed. The apparatus comprises a lean-burn internal combustion engine, engine management means and an exhaust system for treating exhaust gas of the engine. The exhaust system comprises a first oxidation catalyst disposed on a first honeycomb monolith substrate. The first oxidation catalyst comprises platinum supported on a first metal oxide support comprising at least one reducible oxide, and is substantially free of alkali metals and alkaline earth metals. The engine management means is arranged, when in use, intermittently to modulate the lambda composition of the exhaust gas entering the first oxidation catalyst to a rich lambda composition.

13 Claims, 4 Drawing Sheets

(51) Int. Cl.
  *B01D 53/94* (2006.01)
  *B01D 53/96* (2006.01)
  *B01J 23/63* (2006.01)
  *B01J 23/96* (2006.01)
  *F02D 41/02* (2006.01)
  *B01J 23/40* (2006.01)
  *B01J 29/70* (2006.01)
  *B01J 37/02* (2006.01)

(52) U.S. Cl.
  CPC ............... *B01J 23/40* (2013.01); *B01J 23/63* (2013.01); *B01J 23/96* (2013.01); *B01J 29/7007* (2013.01); *B01J 37/0244* (2013.01); *B01J 37/0246* (2013.01); *F02D 41/0275* (2013.01); *B01D 53/9477* (2013.01); *B01D 2255/1021* (2013.01); *B01D 2255/2065* (2013.01); *B01D 2255/2073* (2013.01); *B01D 2255/2094* (2013.01); *B01D 2255/20738* (2013.01); *B01D 2255/20746* (2013.01); *B01D 2255/20761* (2013.01); *B01D 2258/012* (2013.01); *B01J 37/0225* (2013.01)

(56) References Cited

U.S. PATENT DOCUMENTS

| | | | |
|---|---|---|---|
| 5,491,120 | A | 2/1996 | Voss et al. |
| 5,627,124 | A | 5/1997 | Farrauto et al. |
| 5,993,762 | A | 11/1999 | Rajaram et al. |
| 6,248,684 | B1 | 6/2001 | Yavuz et al. |
| 6,274,107 | B1 | 8/2001 | Yavuz et al. |
| 8,505,279 | B2 * | 8/2013 | Mital ............... 60/286 |
| 8,745,973 | B2 * | 6/2014 | Mullins et al. ...... 60/301 |
| 2002/0104312 | A1 | 8/2002 | Hoffman et al. |
| 2002/0182134 | A1 | 12/2002 | Wu et al. |
| 2005/0031514 | A1 | 2/2005 | Patchett et al. |
| 2006/0270548 | A1 | 11/2006 | Pfeifer et al. |
| 2007/0051096 | A1 | 3/2007 | Pfeifer et al. |
| 2008/0098727 | A1 | 5/2008 | Driscoll et al. |
| 2009/0143956 | A1 | 6/2009 | Alessandri et al. |
| 2009/0180943 | A1 | 7/2009 | Caudle |
| 2009/0263685 | A1 | 10/2009 | Lawrence et al. |
| 2010/0221161 | A1 | 9/2010 | Schneider et al. |

FOREIGN PATENT DOCUMENTS

| | | |
|---|---|---|
| EP | 0758713 A1 | 2/1997 |
| EP | 1547682 A1 | 6/2005 |
| EP | 0830201 B2 | 5/2006 |
| EP | 1712278 A1 | 10/2006 |
| EP | 1837076 A1 | 9/2007 |
| GB | 2234450 A | 2/1991 |
| JP | 2004100586 | 4/2004 |
| WO | 9947260 A1 | 9/1999 |
| WO | 0119500 A1 | 3/2001 |
| WO | 2004025093 A1 | 3/2004 |
| WO | 2004076829 A1 | 9/2004 |
| WO | 2008132452 A2 | 11/2008 |
| WO | 2009093071 A1 | 7/2009 |
| WO | 2011092521 A1 | 8/2011 |

OTHER PUBLICATIONS

Great Britain Search Report dated Apr. 29, 2011 for corresponding Great Britain Patent Application No. GB1021887.3 filed Dec. 23, 2010.

Great Britain Search Report dated Apr. 17, 2012 for corresponding Great Britain Patent Application No. GB1121961.5 filed Dec. 21, 2011.

German Search Report dated Jul. 11, 2012 for corresponding German Patent Application No. 102011089371.7 filed Dec. 21, 2011.

International Search Report dated Jun. 6, 2012 for corresponding PCT International Patent Application No. PCT/GB2011/052547 filed Dec. 21, 2011.

Nagai et al., "Sintering Inhibition Mechanism of Platinum Supported on Ceria-based Oxide and Pt-oxide-support Interaction," Journal of Catalysis 242 (2006) 103-109.

Kroger, "Poisoning of Automotive Exhaust Gas Catalyst Components," Acta Universitatis Ouluensis, C 283 (2007) pp. 34.

Ji et al., "Effect of Ceria on the Sulfation and Desulfation Characteristics of a Model Lean NOx Trap Catalyst," Catal Lett 127 (2009) 55-62.

Umicore AG & Co. KG, Opposition to German Patent DE 10 2011 089 71 B4, Sep. 26, 2013.

Umicore AG & Co. KG, Opposition Reply to German Patent DE 10 2011 089 371 B4, Sep. 15, 2014.

Richard van Basshuysen/Fred Schafer (eds.): Lexikon Motorentechnik [Dictionary of Engine Technology], 2nd edition, 2006, keyword Motorsteuerung [Engine Control].

* cited by examiner

OXIDATION CATALYST FOR A LEAN BURN INTERNAL COMBUSTION ENGINE

CROSS-REFERENCE TO RELATED APPLICATIONS

This application is the U.S. National Phase application of PCT International Application No. PCT/GB2011/052547, filed Dec. 21, 2011, and claims priority benefit of U.S. Provisional Patent Application No. 61/425,464, filed Dec. 21, 2010 and Great Britain Patent Application No. 1021887.3, filed Dec. 23, 2010, the disclosures of all of which are incorporated herein by reference in their entireties for all purposes.

FIELD OF THE INVENTION

The present invention relates to an oxidation catalyst for a lean-burn internal combustion engine and in particular it relates to recovering catalytic oxidation activity following ageing in engine exhaust gas. The oxidation catalyst has particular application in the treatment of exhaust gas from vehicular internal combustion engines.

BACKGROUND TO THE INVENTION

A primary purpose of a Diesel Oxidation Catalyst (DOC) is to oxidise certain components of Diesel engine exhaust gas in order to meet a relevant emission standard, such as vehicular regulations including Euro 5. Particularly important reactions include oxidation of carbon monoxide to carbon dioxide, oxidation of gas phase hydrocarbons (derived from unburned fuel) to carbon monoxide and water ($H_2O$) and—for Diesel exhaust gas—oxidation of the liquid soluble organic fraction (SOF) of Diesel particulate matter, which is derived from unburned fuel and lubricating oils.

A conventional Diesel oxidation catalyst for use in treating exhaust gas emitted from a vehicle comprises a noble metal, such as platinum or a mixture of platinum and palladium, supported on an inert high surface area refractory metal oxide, such as optionally stabilised alumina.

While platinum is particularly active amongst precious metals for promoting oxidation reactions, because it is better able to remain in its active metallic form, rather than the less active oxide form, following extended exposure to relatively high temperature lean-burn internal combustion engine exhaust gases, such as those encountered in a so-called "close coupled" position of Diesel-fuelled compression ignition engines, platinum can become oxidised. (The close coupled position is generally where an inlet to a monolith substrate carrying a catalyst is at <75 cm, such as ≤50 cm downstream of an engine exhaust manifold).

$NO_x$ absorber catalysts (NACs) are known e.g. from U.S. Pat. No. 5,473,887 and are designed to adsorb nitrogen oxides ($NO_x$) from lean exhaust gas (lambda>1) and to desorb the $NO_x$ when the oxygen concentration in the exhaust gas is decreased. According to US '887, desorbed $NO_x$ may be reduced to $N_2$ with a suitable reductant, e.g. gasoline fuel, promoted by a catalyst component, such as rhodium, of the NAC itself or located downstream of the NAC. In practice, control of oxygen concentration can be adjusted to a desired redox composition intermittently in response to a calculated remaining $NO_x$ adsorption capacity of the NAC, e.g. richer than normal engine running operation (but still lean of stoichiometric), stoichiometric (i.e. lambda=1 composition) or rich of stoichiometric (lambda<1). It is known that oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity, i.e. substantially more than is required for use as a promoter such as a promoter in a TWC, of a $NO_x$-storage component, such as barium, and a reduction catalyst, e.g. rhodium. One mechanism commonly given for $NO_x$-storage from a lean exhaust gas for this formulation is:

$$NO + \tfrac{1}{2}O_2 \rightarrow NO_2 \quad (1); \text{ and}$$

$$BaO + NO_2 + \tfrac{1}{2}O_2 \rightarrow Ba(NO_3)_2 \quad (2),$$

wherein in reaction (2), the nitric oxide reacts with oxygen on active oxidation sites on the platinum to form $NO_2$. Reaction (3) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

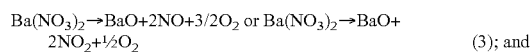

$$Ba(NO_3)_2 \rightarrow BaO + 2NO + 3/2 O_2 \text{ or } Ba(NO_3)_2 \rightarrow BaO + 2NO_2 + \tfrac{1}{2}O_2 \quad (3); \text{ and}$$

$$NO + CO \rightarrow \tfrac{1}{2}N_2 + CO_2 \quad (4);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (1)-(4) above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

Generally, conventional DOCs do not have sufficient activity at low temperatures for advanced future Diesel engines, such as HCCI engines. Exhaust gas from future Diesel engines are projected to have exhaust gas temperatures at least 50° C. lower than that of Diesel engines found in today's commercially available, Euro 5-compliant vehicles. Therefore, substantially improved "light-off" for HC and CO oxidation would be desirable. Conventional Diesel oxidation catalysts generally use the platinum group metal (PGM) Pt, or a combination of both Pt and Pd, each supported on high surface area metal oxide supports such as alumina, silica-alumina, zirconia, titania, or mixtures thereof.

By "light-off" herein we mean the temperature at which a catalyst catalyses a reaction at a desired conversion activity. For example, "CO $T_{50}$" is a temperature at which the catalyst catalyses the conversion of carbon monoxide in a feed gas e.g. to carbon dioxide at least 50% efficiency. Similarly, "HC $T_{80}$" is the temperature at which hydrocarbon, perhaps a particular hydrocarbon such as octane or propene, is converted e.g. to water (steam) and carbon dioxide at 80% efficiency or greater.

A problem with these commercially available catalyst is that a lower, less active, dispersion of PGM is obtained after exposure of the catalyst to higher exhaust gas temperatures, e.g. >300° C. Such lower PGM dispersion, caused by sintering, causes loss of active catalyst sites for the hydrocarbon and carbon monoxide oxidation reactions, and therefore typically temperatures of more than 150° C. are needed to reach complete light-off in Diesel (compression ignition) applications. The combination of Pt with Pd, possibly as an alloy, can desirably reduce Pt sintering. However, this can increase catalyst costs and can reduce Pt's renowned fresh oxidation activity (Pt is most active in its metallic state, whereas Pd is more easily oxidised).

U.S. Pat. No. 5,627,124 discloses a DOC comprising a relatively low loading ($\leq 2$ g/ft$^3$) of platinum supported on stabilized alumina and ceria in approximately equal proportions. Alumina and ceria may be mixed together to form one layer, or may be applied as two separate washcoat layers. According to the specification, the ceria component is active for SOF oxidation. The Pt oxidises gas phase hydrocarbon and carbon monoxide. Specific examples in US '124 comprise Pt loaded on a gamma-alumina underlayer and a mixture of gamma-alumina alumina-stabilized ceria (2.5% $Al_2O_3$) in a top layer.

WO 2004/076829 discloses the use of Pt/ceria or a Pt/ceria-zirconia mixed oxide as a thermally regenerable $NO_x$ storage catalyst, i.e. no periodic changing of the air/fuel mixture fed to the internal combustion engine to rich air/fuel mixtures is necessary; reaction (4) is not actively used.

WO 01/19500 discloses regenerating a sulphur poisoned Diesel catalyst by modulating the air/fuel ratio (lambda) to 0.90 or richer for a time which is in aggregate sufficient to cause release of significant quantities of sulphur-containing species from the catalyst or catalyst components, whereby the catalyst is regenerated. The regeneration can be carried out using pulses of air/fuel ratio modulation from 250 milliseconds to 5 seconds in duration. The specific examples mention a platinum-based oxidation catalyst at 90 g/ft$^3$ loading, but there is no disclosure of any support material on which the catalyst may be supported.

WO 2004/025093 discloses a compression ignition engine operable in a first, normal running mode and a second mode producing exhaust gas comprising an increased level of carbon monoxide (CO) relative to the first mode and means when in use to switch engine operation between the two modes, which engine comprising an exhaust system comprising a supported palladium (Pd) catalyst associated with at least one base metal promoter and an optionally supported platinum (Pt) catalyst associated with and/or downstream of the Pd catalyst wherein CO is oxidised by the supported Pd catalyst during second mode operation. The only disclosure of second running mode producing rich exhaust gas, i.e. lambda<1, is wherein the catalyst comprises a $NO_x$ absorber.

S. E. Golunski et al. published an academic paper entitled "Origins of low-temperature three-way activity in Pt/CeO$_2$" in Applied Catalysis B: Environmental 5 (1995) 367-376.

US 2010/0221161 discloses an device for the purification of Diesel exhaust gases, which device comprises, in the flow direction of the exhaust gas, an oxidation catalyst, a Diesel particle filter with catalytically active coating, and downstream of a device for introducing a reducing agent from an external reducing agent source, and SCR catalyst. The oxidation catalyst and the catalytically active coating of the Diesel particle filter contain palladium and platinum. The ratio of the noble metals platinum and palladium in the overall system and on the individual components, oxidation catalyst and catalytically coated Diesel particle filter, are coordinated with one another in such a way as to obtain firstly an optimum NO/NO$_2$ ratio in the exhaust gas upstream of the downstream SCR catalyst, and secondly optimum heating and HC conversion behaviour during an active particle filter regeneration.

We have now discovered, very surprisingly that by contacting an oxidation catalyst comprising platinum and a reducible oxide intermittently and momentarily with a rich exhaust gas, the oxidation catalyst can recover oxidation activity caused by the platinum becoming oxidised at higher temperatures.

SUMMARY OF THE INVENTION

The invention is an apparatus that comprises a lean-burn internal combustion engine, engine management means and an exhaust system for treating exhaust gas of the engine. The exhaust system comprises a first oxidation catalyst disposed on a first honeycomb monolith substrate. The first oxidation catalyst comprises platinum supported on a first metal oxide support comprising at least one reducible oxide, and is substantially free of alkali metals and alkaline earth metals. The engine management means is arranged, when in use, intermittently to modulate the lambda composition of the exhaust gas entering the first oxidation catalyst to a rich lambda composition. The invention also includes a method of recovering the oxidation activity of the first oxidation catalyst aged in an exhaust gas of a lean-burn internal combustion engine.

DETAILED DESCRIPTION OF THE INVENTION

Figure 1:
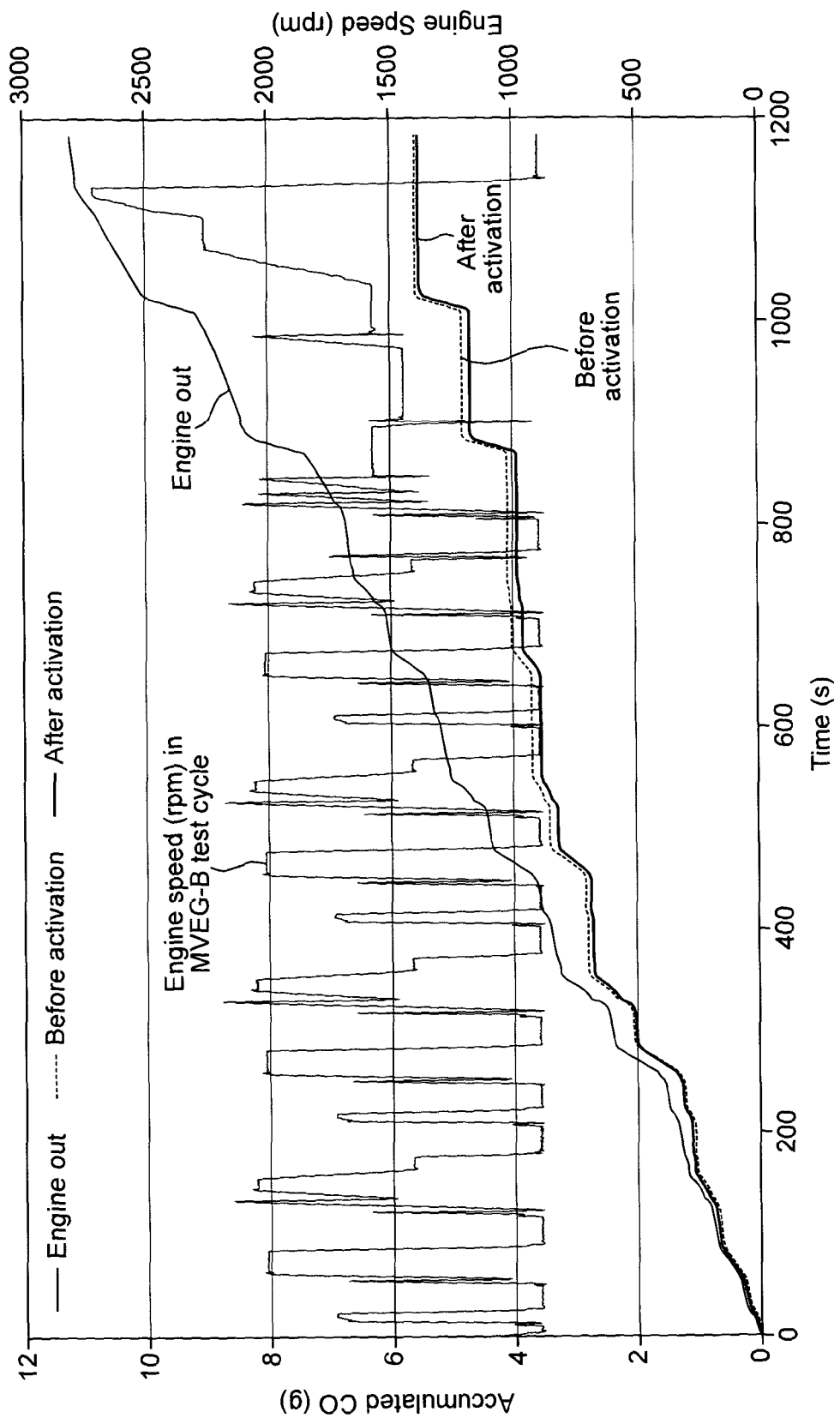
FIG. 1 is a graph showing the accumulated CO, both engine-out and post-catalyst, for a Conventional DOC (not according to the invention) fitted to a bench-mounted 2.0 liter Diesel engine run over the MVEG-B European emission test cycle, both before and after activation.

According to one aspect, the invention provides an apparatus comprising a lean-burn internal combustion engine, engine management means and an exhaust system for treating exhaust gas of the engine, which exhaust system comprising a first oxidation catalyst disposed on a first honeycomb monolith substrate, which first oxidation catalyst comprising platinum supported on a first metal oxide support comprising at least one reducible oxide, wherein the first oxidation catalyst is substantially free of alkali metals and alkaline earth metals, wherein the engine management means is arranged, when in use, intermittently to modulate the lambda composition of the exhaust gas contacting the first oxidation catalyst to a rich lambda composition.

As used herein the term "bulk" to refer to a reducible oxide such as ceria (or any other component) means that the ceria is present as solid particles thereof. These particles are usually very fine, of the order of at least 90 percent of the particles being from about 0.5 to 15 microns in diameter. The term "bulk" is intended to distinguish from the situation in which ceria is "dispersed" on a refractory support material e.g. by being impregnated into the support material from a solution e.g. cerium nitrate or some other liquid dispersion of the component and then dried and calcined to convert the impregnated cerium nitrate to a dispersion of ceria particles on a surface of the refractory support. The resultant ceria is thus "dispersed" onto and, to a greater or lesser extent, within a surface layer of the refractory support. The dispersed ceria is not present in bulk form, because bulk ceria comprises fine, solid particles of ceria. The dispersion can also take the form of a sol, i.e. finely divided particles of e.g. ceria on the nanometer scale.

While it is known from exhaust systems comprising NACs, such as are disclosed in U.S. Pat. No. 5,473,887 and WO 2004/025093, intermittently to contact the NAC with rich exhaust gas in order to regenerate the NAC, i.e. to release and reduce stored $NO_x$, NAC technology is excluded from the present invention because the oxidation catalyst is substantially free of alkali metals and alkaline earth metals.

The arrangement of WO 2004/076829 is also excluded because in that system $NO_x$ is thermally desorbed during lean operation and a rich exhaust gas is not used to regenerate the $NO_x$ storage catalyst.

The processes of producing an optimum $NO/NO_2$ ratio in the exhaust gas upstream of the downstream SCR catalyst, and of optimum heating and HC conversion behaviour during an active particle filter regeneration of US 2010/0221161 are done using an overall lean exhaust gas and not a rich exhaust gas.

Methods of providing intermittently rich exhaust gas by adjusting fuel injection timing in one or more engine cylinders are known from publications disclosing exhaust systems comprising NACs, such as those disclosed in U.S. Pat. No. 5,473,887. Alternatively, also as discussed in U.S. Pat. No. 5,473,887, the engine management means may be adapted to inject hydrocarbon fuel directly into the exhaust system carrying the exhaust gas, i.e. downstream of the engine exhaust manifold.

In embodiments, the proposed new catalyst comprises a multiple-layer DOC, with at least one layer desirably, though not essentially, exhibiting SMSI (Strong Metal Support Interaction) characteristics (see (1) hereinbelow) and at least one layer being a "conventional" DOC as described hereinabove (see also (3) hereinbelow). The catalyst may be part of a system configuration which is configured to provide rich events (see (3) hereinbelow):

(1) By supporting PGM on a first metal oxide support such as ceria, the degree of PGM sintering can be significantly reduced and therefore a large number of catalyst active sites remain after thermal ageing. However each catalyst site is not very active because of the oxidic characteristic of the Pt or PtPd catalyst site. The most active form of the PGM is its metallic state and we have found, very surprisingly, that for catalysts according to the invention the active form is substantially regenerated when it is exposed to rich conditions.

(2) Ceria and ceria-zirconia have been used in $NO_x$ traps in combination with other metals such as K, Cs, Ba, Sr for improving $NO_x$ storage functions. However, in the present invention, such additional materials are preferably not used because of their inhibiting effect for HC and CO oxidation.

(3) The conventional layer is used to maintain acceptable catalytic activity when it is not possible to perform a rich event when planned. For example, the majority of the oxidation activity will occur on at least one of the layers after prolonged exposure to relatively high lean temperature.

In order to fully use the attributes of the catalyst according to the invention, the catalyst may be activated by exposure to rich exhaust gas conditions for a short period of time. Following the rich activation step, the catalyst remains active in the normal lean operating conditions for a substantial duration. Exposure of the catalyst to high temperature lean conditions can deactivate the catalyst, and therefore a predetermined algorithm is used to determine when catalyst re-activation is required.

Illustrative examples of reducible oxides are oxides, composite oxides and mixed oxides of at least one metal selected from the group consisting of manganese, iron, tin, copper, cobalt and cerium, such as at least one of $MnO_2$, $Mn_2O_3$, $Fe_2O_3$, $SnO_2$, CuO, CoO and $CeO_2$. It is believed that at least one of these reducible oxides exhibit SMSI activity supporting platinum for oxidation hydrocarbons and carbon monoxide. The reducible oxide can be dispersed on a suitable support and/or the support per se can comprise particulate bulk reducible oxide. An advantage of, e.g. $CeO_2$, is that it is relatively thermally stable, but it is susceptible to sulphur poisoning. Manganese oxides are not as thermally stable, but they are more resistant to sulphur poisoning. Manganese oxide thermal stability can be improved by combining it in a composite oxide or mixed oxide with a stabiliser, such as zirconium. To some extent, ceria can be made more sulphur tolerant by forming a composite oxide or a mixed oxide with a suitable stabiliser, such as zirconium and/or a rare earth metal (other than cerium).

By "reducible oxide" herein, we mean that an oxide is present in situ wherein the metal has more than one oxidation state. In manufacture, the metal can be introduced as a non-oxide compound and oxidised by calcinations to the reducible oxide.

"Composite oxide" as defined herein means a largely amorphous oxide material comprising oxides of at least two elements which are not true mixed oxides consisting of the at least two elements.

Where the reducible oxide comprises, $CeO_2$ the ceria can be stabilised with zirconia, at least one non-cerium rare earth oxide or both zirconia and at least one non-cerium rare earth oxide. For example, a ceria-containing mixed oxide can include 86% by weight ceria, 10% by weight zirconia and lanthana balance; or 80% ceria, 10% zirconia, 3% lanthana, 7% praseodymia; or 65% ceria, 27% zirconia and 8% praseodymia.

In a particular embodiment, the first metal oxide support consists essentially of bulk at least one reducible oxide or optionally stabilised homologues thereof. Alternatively, the at least one reducible oxide or optionally stabilised homologue thereof can be supported, i.e. as a dispersion on the first metal oxide support with the platinum.

In addition to platinum, preferably the first oxidation catalyst can comprise palladium supported on the first metal oxide support. However, in a one embodiment, the first oxidation catalyst is substantially free of palladium.

Platinum group metals, in the first oxidation catalyst can be loaded on the monolith substrate at any suitable loading, such as >10 $gft^{-3}$. For catalysts where the platinum group metal consists of platinum, the platinum loading can be 10-120 $gft^{-3}$ and is preferably 30-60 $gft^{-3}$. In preferred embodiments comprising Pt and Pd the total platinum group metal loading can be from 15 to 300 $gft^{-3}$, such as from 30 to 150 $gft^{-3}$, e.g. 40 to 120 $gft^{-3}$.

The first oxidation catalyst can comprise one or more molecular sieve, e.g. aluminosilicate zeolites. A duty of the molecular sieve in the first oxidation catalyst is for improving hydrocarbon conversion over a duty cycle by storing hydrocarbon following cold start or during cold phases of a duty cycle and releasing stored hydrocarbon at higher temperatures when associated platinum group metal catalyst components are more active for HC conversion. See for example Applicant/Assignee's EP 0830201. Molecular sieves are typically used in catalyst compositions according to the invention for light-duty Diesel vehicles, whereas they are rarely used in catalyst compositions for heavy duty Diesel applications because the exhaust gas temperatures in heavy duty Diesel engines mean that hydrocarbon trapping functionality is generally not required. Where the first oxidation catalyst according to the invention comprises two or more layers, it is highly preferred that at least one of the two or more layers includes molecular sieve. Most preferably, in a two layer embodiment, both the first (or bottom) layer and the second (top) layer include molecular sieve.

However, molecular sieves such as aluminosilicate zeolites are not particularly good supports for platinum group metals because they are mainly silica, particularly relatively higher silica-to-alumina molecular sieves, which are favoured for their increased thermal durability: they may thermally degrade during ageing so that a structure of the molecular sieve may collapse and/or the PGM may sinter, giving lower dispersion and consequently lower HC and/or CO conversion activity. Accordingly, in a preferred embodiment, the first oxidation catalyst comprises a molecular sieve at ≤30% by weight (such as ≤25% by weight, ≤20% by weight e.g. ≤15% by weight) of the individual washcoat coating layer. In addition to the platinum supported on a first metal oxide support comprising at least one reducible oxide, the composition of the first oxidation catalyst may also comprise at least one metal oxide selected from the group consisting of optionally stabilised alumina, amorphous silica-alumina, optionally stabilised zirconia, titania and mixtures of any two or more thereof.

Preferred molecular sieves for use as support materials/hydrocarbon adsorbers are medium pore zeolites, preferably aluminosilicate zeolites, i.e. those having a maximum ring size of ten tetrahedral atoms, and large pore zeolites (maximum ring size of twelve tetrahedral atoms) preferably aluminosilicate zeolites, include natural or synthetic zeolites such as faujasite, clinoptilolite, mordenite, silicalite, ferrierite, zeolite X, zeolite Y, ultrastable zeolite Y, ZSM-5 zeolite, ZSM-12 zeolite, SSZ-3 zeolite, SAPO-5 zeolite, offretite or a beta zeolite, preferably ZSM-5, beta and Y zeolites. Preferred zeolite adsorbent materials have a high silica to alumina ratio, for improved hydrothermal stability. The zeolite may have a silica/alumina molar ratio of from at least about 25/1, preferably at least about 50/1, with useful ranges of from about 25/1 to 1000/1, 50/1 to 500/1 as well as about 25/1 to 100/1, 25/1 to 300/1, from about 100/1 to 250/1.

A recognised problem with the use of ceria or ceria-based components in oxidation catalysts is that its activity can be compromised if it becomes sulphated with sulphur-containing species present in engine fuel or engine lubricant. The present inventors propose to reduce or prevent this effect by including at least one component in the first oxidation catalyst which acts as a "sink" for the sulphur, i.e. a component which disproportionately adsorbs sulphur from exhaust gas relative to other components of the first oxidation catalyst thereby reducing or preventing sulphur poisoning of active components of the first oxidation catalyst. Preferably this "sulphur sink" is regenerable, i.e. it is possible to release sulphur species absorbed (or adsorbed) thereon so that the capacity of the "sulphur sink" is not finite.

In preferred embodiments, the "sulphur sink" component comprises a molecular sieve comprising copper and/or iron, which molecular sieve is preferably an aluminosilicate zeolite. The copper and/or iron can be impregnated, ion exchanged or present in a lattice structure of the molecular sieve per se. In a particularly preferred embodiment, the copper and/or iron containing molecular sieve also comprises one or more platinum group metal, preferably palladium, at relatively low loading, e.g. ≤30 gft$^{-3}$, which one or more platinum group metal may be impregnated as an aqueous salt thereof onto the copper and/or iron-containing molecular sieve. It has been found that the molecular sieve comprising copper and/or iron, optionally also comprising platinum group metals, are regenerable when in use, for example when exposed to lean exhaust gas at temperatures of up to about 650° C. Such conditions may occur when the first oxidation catalyst is disposed upstream of a catalysed filter and a filter regeneration event is triggered (see also below for further explanation). A primary purpose of the filter regeneration event is to combust particulate matter held on the filter, and for this purpose the exhaust gas temperature is raised. However, since the filter regeneration event requires the temperature to be raised, as a beneficial side-effect, the first oxidation catalyst is exposed to lean, high temperature exhaust gas which can cause sulphur-containing species absorbed on the sulphur sink component t of the first oxidation catalyst to be desorbed.

Where a molecular sieve is included as a "sulphur sink", the first oxidation catalyst preferably comprises two layers, wherein a first (or lower) layer comprises the sulfur sink component and a second (or upper) layer comprises the platinum supported on a first metal oxide support comprising at least one reducible oxide.

Preferably, quantities of the copper and/or iron-containing molecular sieve-based sulfur sink component are present in the first oxidation catalyst, e.g. the lower layer, at ≤50% by weight of the first oxidation catalyst as a whole. This is in addition to any molecular sieve hydrocarbon trap component, mentioned hereinabove. So, where the first oxidation catalyst comprises two layers, with a lower layer of the copper and/or iron-based molecular sieve-based sulfur sink component at a washcoat loading of 2.0 gin$^{-3}$ and an upper layer comprising the platinum supported on a first metal oxide support comprising at least one reducible oxide and a molecular sieve for hydrocarbon trapping, which upper layer is also at a washcoat loading of 2.0 gin$^{-3}$, the total molecular sieve content of the first oxidation catalyst, i.e. the lower and upper layers of the catalyst combined, can be ≤65 wt % (i.e. ≤50 wt % sulfur sink molecular sieve and ≤15 wt % hydrocarbon trap molecular sieve (but ≤30 wt % hydrocarbon trap molecular sieve in the upper layer alone). Alternatively, the sulfur sink component and the platinum supported on a first metal oxide support comprising at least one reducible oxide and optional hydrocarbon trap molecular sieve components can be mixed and applied in a single washcoat layer.

Molecular sieves with particular application in this "sulphur sink" aspect of the present invention include any of those mentioned hereinabove and include also small pore molecular sieves, i.e. those having a maximum ring size of eight tetrahedral atoms. Molecular sieves for use in embodiments include a beta zeolite, a faujasite (such as an X-zeolite or a Y-zeolite, including NaY and USY), a L-zeolite, a ZSM zeolite (e.g., ZSM-5, ZSM-48), a SSZ-zeolite (e.g., SSZ-13, SSZ-41, SSZ-33), a mordenite, a chabazite, an offretite, an erionite, a clinoptilolite, a silicalite, an aluminium phosphate zeolite (including metalloaluminophosphates such as SAPO-34), a mesoporous zeolite (e.g., MCM-41, MCM-49, SBA-15), a metal-incorporated zeolite, or mixtures thereof; more preferably, the zeolites are beta zeolite, ZSM-5 zeolite, Fe-β zeolite, or SSZ-33, or Y-zeolite. The zeolite is most preferably beta zeolite, ZSM-5 zeolite, Fe-β zeolite, or SSZ-33. Most preferred is Fe/Beta zeolite, optionally supporting palladium.

In a preferred embodiment, the first oxidation catalyst is combined with a second oxidation catalyst different from the first oxidation catalyst, which second oxidation catalyst comprises at least one precious metal supported on a second metal oxide support.

In one such arrangement, the first and second oxidation catalysts are each disposed in separate layers. In a particular embodiment, the second oxidation catalyst is disposed on the first honeycomb monolith substrate in an underlayer and the first oxidation catalyst is disposed in a layer overlying the second oxidation catalyst (either directly on the underlayer or an intermediate layer(s) is interposed therebetween). However, the order of the first and second oxidation catalyst can be reversed, as desired.

In an alternative arrangement, the metal oxide support of the first oxidation catalyst and the metal oxide support of the second oxidation catalyst are combined in a single layer disposed on the first honeycomb monolith substrate.

In a further alternative embodiment, the first oxidation catalyst is located in a first zone disposed on the first honeycomb monolith substrate and the second oxidation catalyst is located in a second zone on the first honeycomb monolith substrate, wherein the first honeycomb monolith substrate is oriented so that exhaust gas contacts the first zone prior to the second zone. However, the first honeycomb monolith substrate can be oriented so that exhaust gas contacts the second zone prior to the first zone as desired.

In a further alternative embodiment, the first honeycomb monolith substrate comprising the first oxidation catalyst is disposed upstream of a second honeycomb monolith substrate comprising the second oxidation catalyst. However, the second monolith substrate can be oriented so that exhaust gas contacts the second monolith substrate prior to the first monolith substrate as desired.

The honeycomb monolith substrate for use in the present invention can be made from a ceramic material such as cordierite or silicon carbide, or a metal such as Fecralloy™. The arrangement is preferably a so-called flow-through configuration, in which a plurality of channels extend in parallel from an open inlet end to an open outlet end. However, the honeycombed monolith substrate may also take the form of a filtering substrate such as a so-called wall-flow filter or a ceramic foam.

Wall-flow filters are ceramic porous filter substrates comprising a plurality of inlet channels arranged in parallel with a plurality of outlet channels, wherein each inlet channel and each outlet channel is defined in part by a ceramic wall of porous structure, wherein each inlet channel is alternatingly separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

In embodiments comprising two or more honeycomb monolith substrates in series, each monolith substrate may be selected from flow-through and filtering configurations. Where a first monolith substrate has a flow-through configuration and a second monolith substrate has a filtering configuration, it is preferred that the filtering monolith substrate is disposed downstream of the flow-through monolith substrate, to obtain the benefits of combusting particulate matter trapped on the filtering substrates at less than 400° C. in $NO_2$ generated from oxidising NO on the upstream flow-through monolith substrate (as disclosed in EP 341832). However, in one preferred embodiment, the apparatus comprises a single monolith substrate, i.e. with no downstream monolith substrate, e.g. filtering substrate.

In appropriate applications, the first honeycomb monolith substrate or, where present, the first and second honeycomb monolith substrates, can be used without any additional exhaust gas aftertreatment components, i.e. exhaust gas exiting the first honeycomb monolith substrate or, where present, the second honeycomb monolith substrate is exhausted directly to atmosphere without first encountering additional catalyst(s). However, as desired, oxidation catalysts according to the present invention can be integrated into more complex exhaust system architecture. In one embodiment, the first honeycomb monolith substrate, and where present the second honeycomb monolith substrate, is disposed upstream of a filter for filtering particulate matter from the exhaust gas. Optionally, the filter is catalysed.

In one embodiment, the filter catalyst is for oxidising carbon monoxide and unburned hydrocarbon in the exhaust gas, i.e. a so-called catalysed soot filter for treating, e.g. particulate matter emitted by Diesel (compression ignition) engines.

Where the exhaust system comprises a filter, a further embodiment features a $NH_3$—SCR catalyst disposed downstream of the filter. Such arrangement can include means for introducing nitrogenous reductant, including precursors, to upstream of the SCR catalyst, e.g. nitrogenous reductant can be introduced between the filter and the SCR catalyst. Alternatively, the $NH_3$—SCR catalyst can be coated on the filter.

Alternatively, and in a preferred embodiment, the filter catalyst is a catalyst for selectively catalysing the reduction of oxides of nitrogen using a nitrogenous reductant. As described above, such an arrangement can include means for introducing nitrogenous reductant, including precursors, to upstream of the SCR catalysed filter. As a further alternative, or in addition to the means for injecting nitrogenous reductant or a precursor thereof, in another embodiment, engine management means is provided for enriching exhaust gas such that ammonia gas is generated in situ by reduction of $NO_x$ on the first oxidation catalyst. In this embodiment, and in combination with an appropriately designed and managed engine, enriched exhaust gas, i.e. exhaust gas containing increased quantities of carbon monoxide and hydrocarbon relative to normal lean running mode, contacts the catalyst composition of the first substrate monolith. PGM-promoted ceria or ceria-zirconia can promote the water-gas shift reaction, i.e. $CO_{(g)} + H_2O_{(v)} \rightarrow CO_{2(g)} + H_{2(g)}$ evolving $H_2$. From the side reaction footnote to reactions (3) and (4) set out hereinabove, e.g. $Ba(NO_3)_2 + 8H_2 \rightarrow BaO + 2NH_3 + 5H_2O$, $NH_3$ can be generated in situ and stored for $NO_x$ reduction on the downstream SCR catalyst.

For certain SCR catalysts, the catalytic reduction of oxides of nitrogen using nitrogenous reductants can be promoted by adjusting—preferably, as far as is possible passively—the ratio of $NO:NO_2$ to approximately 1:1. For this reason the oxidation catalyst can be optimised for use in embodiments including SCR catalysts to generate approximately 1:1 $NO:NO_2$ ratio for the benefit of $NO_x$ reduction on a downstream SCR catalyst in as wide a temperature window as possible.

Catalysts for selectively catalysing the reduction of oxides of nitrogen using nitrogenous reductant (SCR catalysts) are known and can be selected from the group consisting of at least one of Cu, Hf, La, Au, In, V, lanthanides and Group VIII transition metals, such as Fe, supported on a refractory oxide or molecular sieve. Suitable refractory oxides include $Al_2O_3$, $TiO_2$, $CeO_2$, $SiO_2$, $ZrO_2$ and mixed oxides containing two or more thereof. The non-zeolite catalyst can also include tungsten oxide, e.g. $V_2O_5/WO_3/TiO_2$.

In particular embodiments, the SCR catalyst comprises at least one molecular sieve, such as an aluminosilicate zeolite or a SAPO. The at least one molecular sieve can be a small, a medium or a large pore molecular sieve, for example. By "small pore molecular sieve" herein we mean molecular sieves containing a maximum ring size of 8 tetrahedral atoms, such as CHA; by "medium pore molecular sieve" herein we mean a molecular sieve containing a maximum ring size of 10 tetrahedral atoms, such as ZSM-5; and by "large pore molecular sieve" herein we mean a molecular sieve having a maximum ring size of 12 tetrahedral atoms, such as beta. Small pore molecular sieves are potentially advantageous for use in SCR catalysts—see for example WO 2008/132452 (the entire contents of which is incorporated herein by reference).

Particular molecular sieves with application in the present invention are selected from the group consisting of AEI, ZSM-5, ZSM-20, ERI including ZSM-34, mordenite, ferrierite, BEA including Beta, Y, CHA, LEV including Nu-3, MCM-22 and EU-1. CHA molecular sieves are currently preferred, particularly in combination with Cu as promoter, e.g. ion-exchanged and/or impregnated.

In embodiments, the molecular sieves can be un-metallised or metallised with at least one metal selected from the group consisting of groups IB, IIB, IIIA, IIIB, VB, VIB, VIB and VIII of the periodic table. Where metallised, the metal can be selected from the group consisting of Cr, Co, Cu, Fe, Hf, La, Ce, In, V, Mn, Ni, Zn, Ga and the precious metals Ag, Au, Pt, Pd and Rh. Such metallised molecular sieves can be used in a process for selectively catalysing the reduction of nitrogen oxides in positive ignition exhaust gas using a reductant. By "metallised" herein we mean to include molecular sieves including one or more metals incorporated into a framework of the molecular sieve e.g. Fe in-framework Beta and Cu in-framework CHA. Molecular sieves can be ion-exchanged with any of the above metals.

Metals of particular interest are selected from the group consisting of Ce, Fe and Cu. Suitable nitrogenous reductants include ammonia. Alternatively, the nitrogenous reductant or a precursor thereof can be injected directly into the exhaust gas. Suitable precursors include ammonium formate, urea and ammonium carbamate. Decomposition of the precursor to ammonia and other by-products can be by hydrothermal or catalytic hydrolysis.

In an alternative arrangement, a flow-through monolith substrate comprising a SCR catalyst for reducing oxides of nitrogen using nitrogenous reductant can be located downstream of the first monolith substrate, and where present the second monolith substrate, thereby beneficially to adjust the $NO:NO_2$ ratio in exhaust gas entering the SCR catalyst.

In a particularly preferred embodiment, the SCR catalyst is coated on a filtering substrate monolith, preferably a wall-flow monolith. It is also possible to make a wall-flow filter from an extruded SCR catalyst (see Applicant/Assignee's WO 2009/093071 and WO 2011/092521).

Engines for use in the apparatus according to the invention can be a gasoline, spark ignition engine, but has particular relevance to compression ignition engines, generally known as Diesel engines, though some compression ignition engines can operate on other fuels, such as natural gas, bioDiesel or Diesel fuel blended with bioDiesel and/or Fischer-Tropsch fuels.

According to a further aspect, the invention provides a vehicle comprising an apparatus according to any preceding claim.

According to a yet further aspect, the invention provides a method of recovering an oxidation activity of a first oxidation catalyst aged in an exhaust gas of a lean-burn internal combustion engine, which first oxidation catalyst comprising platinum supported on a first metal oxide support and disposed on a honeycomb monolith substrate, which method comprising the step of intermittently contacting the first oxidation catalyst with exhaust gas modulated to a rich lambda composition, wherein the first metal oxide support comprises at least one reducible oxide and wherein the first oxidation catalyst is substantially free of alkali metals and alkaline earth metals.

In use, the engine management means is configured, e.g. by programming of an electronic processor, to modulate the lambda composition of the exhaust gas contacting the first oxidation catalyst to a rich lambda composition. In practice, it is not possible to run the engine continuously rich in order to avoid driveability issues, such as torque shock that can be communicated through the driver via the steering column and steering wheel. Preferred configurations include frequently modulating $\lambda$ ("lean/rich" switching) for a period of time sufficient to recover oxidation activity to a desired degree. Such lean/rich switching can set up exotherms in the oxidation catalyst, increasing catalyst temperature e.g. >550° C. Lean/rich switching configurations for use in the present invention are known, e.g. from the art of $NO_x$ trap desulphation regimes. However, $NO_x$ trap desulfation regimes take place approximately once about every 2,000-3,000 km that a vehicle has driven. Limits of enrichment may depend on the apparatus design but may be >0.80, e.g. ≥0.90, such as ≥0.95. However, it is essential that the exhaust gas composition is at <1 during oxidation catalyst activity regeneration.

In a particularly preferred embodiment of the method of the invention, used in connection with an apparatus comprising a catalysed filter, e.g. the first oxidation catalyst a SCR coated filter or a catalysed soot filter (CSF), i.e. a filter comprising one or more platinum group metals, disposed downstream of a monolith substrate comprising the first oxidation catalyst, the method step of recovering an oxidation activity of a first oxidation catalyst is conducted immediately following a step to regenerate the filter. Particularly in light-duty Diesel applications, the system is designed to run a protocol which heats the exhaust system components, e.g. by engine management means such as in-cylinder post-ignition injection of hydrocarbon fuel, in order to combust any soot held on the filter thereby to return the system to a "clean" state and prevent any issues with soot build-up, e.g. back pressure problems. Filter temperatures can reach 600-650° C. in an overall lean exhaust gas (despite increased hydrocarbon injection). Such filter regeneration protocols are typically done approximately once every 500 km a vehicle has driven.

The method of the present invention can be fuel intensive, in that a rich exhaust gas is used. The preferred aspect of the invention takes advantage of the temperature increase developed by the filter regeneration step so that when the engine is operated by engine management means to contact the first oxidation catalyst with rich exhaust (or increased hydrocarbon is injected into the exhaust gas downstream of the engine) the first oxidation catalyst is already at a relatively high temperature. This has the advantage that oxidation activity of the first oxidation catalyst is recovered more quickly when the first oxidation catalyst is hotter and at a reduced fuel penalty to the system.

Figure 2:
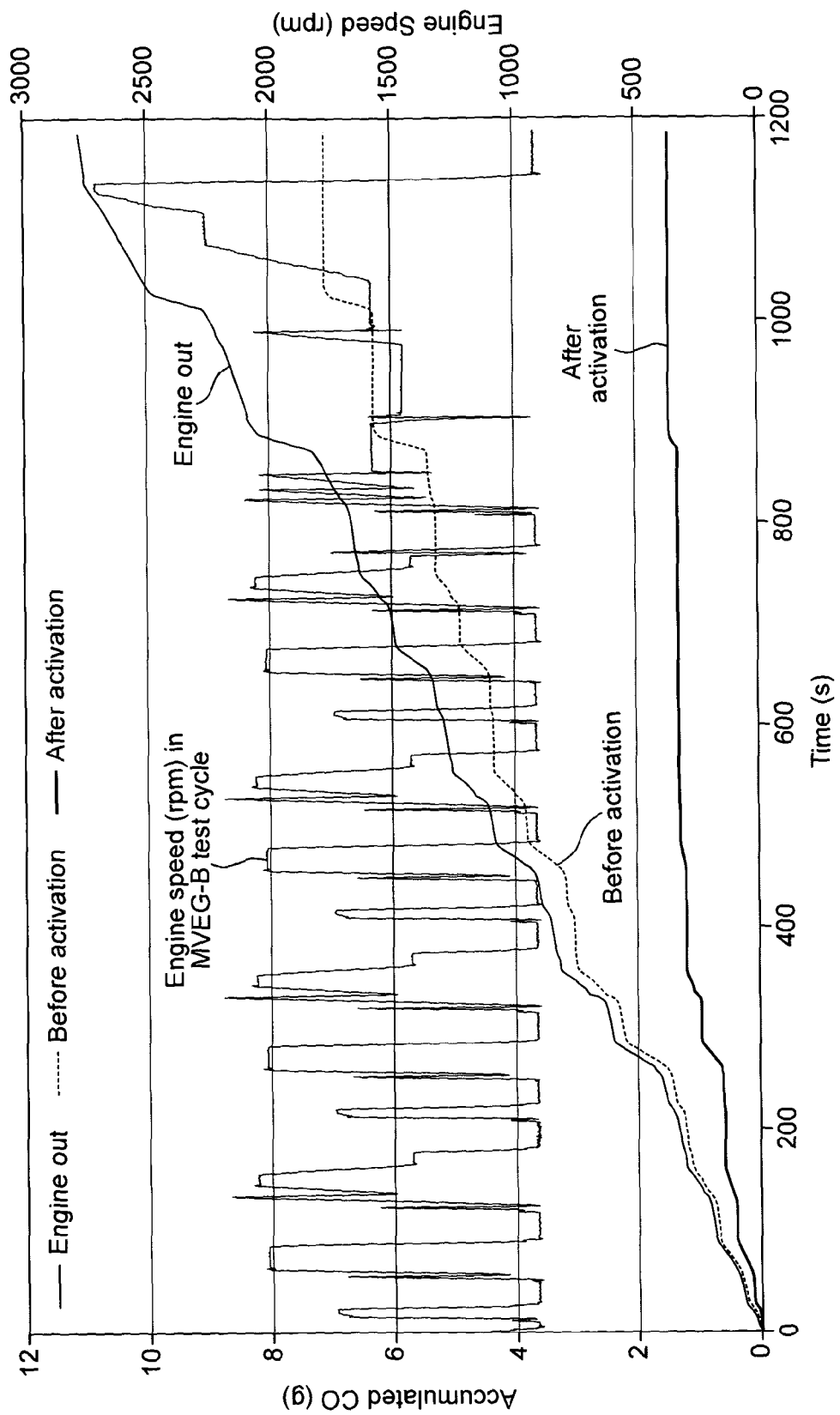
FIG. 2 is a graph showing accumulated CO, both engine-out and post-catalyst, for a DOC according to the invention fitted to the engine used to test the Conventional DOC in FIG. 2 and run over the same cycle, both before and after activation.
Figure 3:
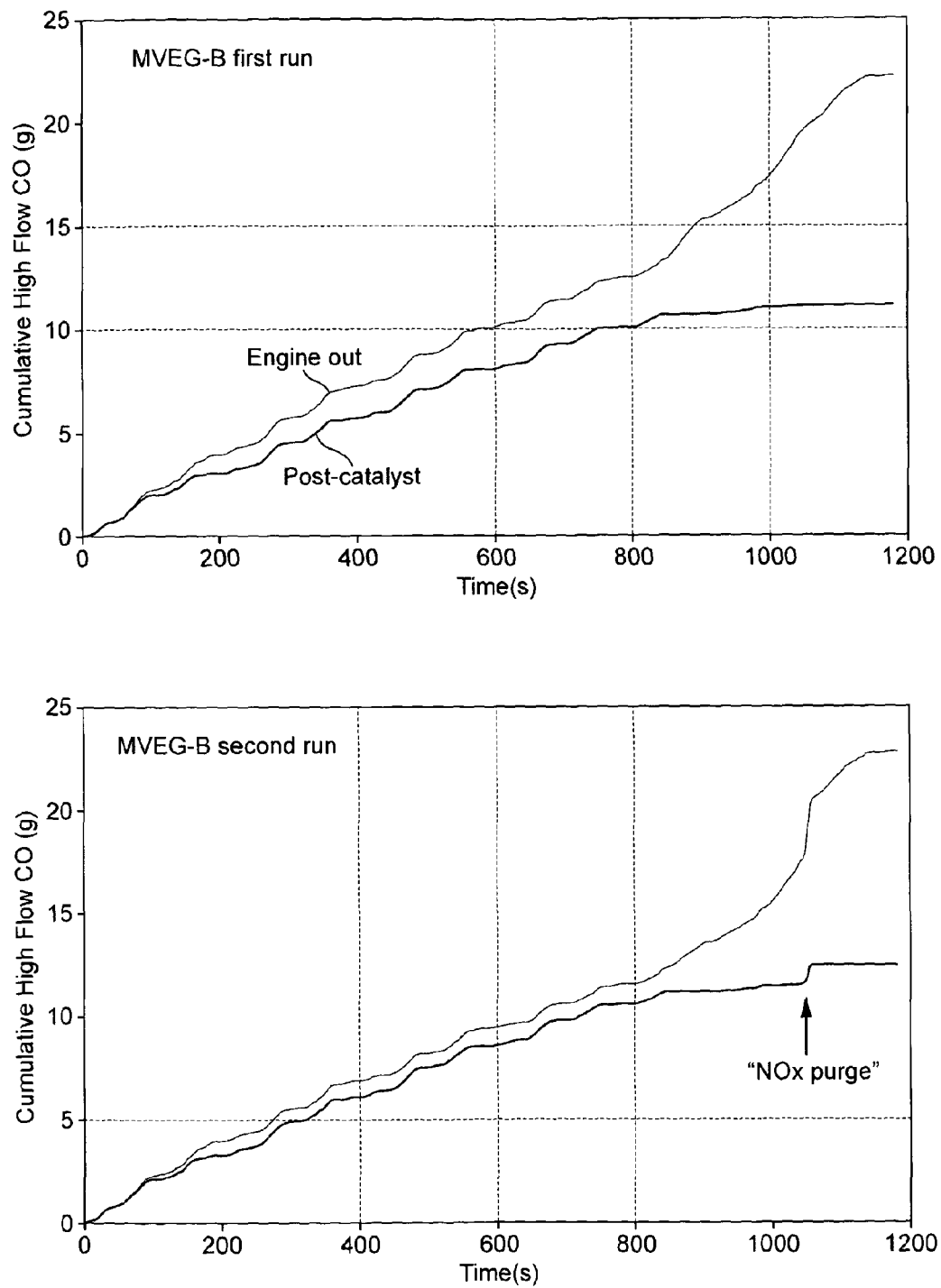
FIG. 3 shows a series of graphs displaying the cumulative CO detected at engine-out (top trace) and post-catalyst (bottom trace) on a different 2.0 liter Diesel engine from the one used in FIGS. 1 and 2, including the effects of "in-cycle" activation.
Figure 3:
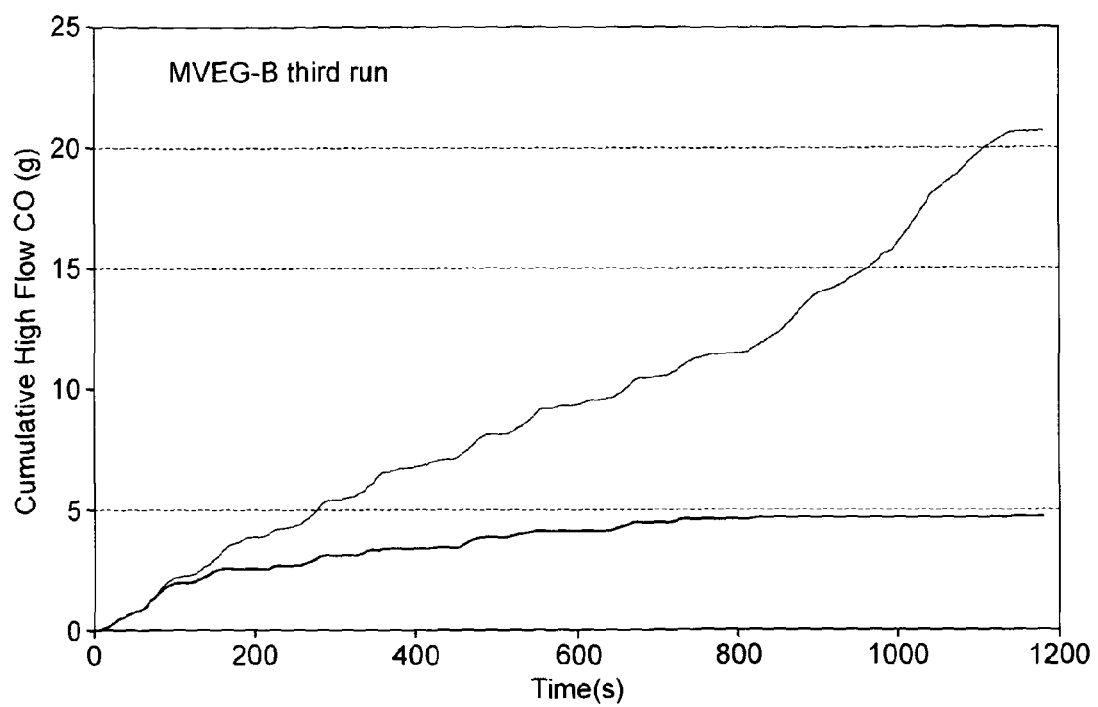

In order that the invention may be more fully understood, the following Examples are provided by way of illustration only and with reference to the accompanying drawings, in which:

FIG. 1 is a graph showing the accumulated CO, both engine-out and post-catalyst, for a Conventional DOC (not according to the invention) fitted to a bench-mounted 2.0 liter Diesel engine run over the MVEG-B European emission test cycle, both before and after activation;

FIG. 2 is a graph showing accumulated CO, both engine-out and post-catalyst, for a DOC according to the invention fitted to the engine used to test the Conventional DOC in FIG. 2 and run over the same cycle, both before and after activation; and FIG. 3 shows a series of graphs displaying the cumulative CO detected at engine-out (top trace) and post-catalyst (bottom trace) on a different 2.0 liter Diesel engine from the one used in FIGS. 1 and 2, including the effects of "in-cycle" activation.

EXAMPLES

Example 1

Manufacture of Fully Formulated DOC

A honeycomb 400 cells per square inch flow-through cordierite monolith substrate was coated with a two-layer Conventional catalyst, wherein a first layer comprised 1.67 $gin^{-3}$ $Al_2O_3$ and 0.33 $gin^{-3}$ Beta zeolite (2 $gin^{-3}$ washcoat loading in total for the bottom layer) and PtPd and a second, overlayer comprised 0.833 $gin^{-3}$ $Al_2O_3$ and 0.167 $gin^{-3}$ Beta zeolite (1 $gin^{-3}$ washcoat loading in total for the top layer) and Pt only. The first layer was applied to a virgin monolith substrate as a washcoat containing salts of Pt and Pd using the methods disclosed in WO 99/47260, i.e. comprising the steps of (a) locating a containment means on top, first end of a substrate monolith, (b) dosing a pre-determined quantity of a first washcoat coating component into said containment means, either in the order (a) then (b) or (b) then (a), and (c) by applying pressure or vacuum, drawing said first washcoat coating component into at least a portion of the substrate monolith, and retaining substantially all of said quantity within the substrate monolith. In a first step a coating from a first end of application can be dried and the dried substrate monolith can be flipped through 180 degrees and the same procedure can be done to a top, second end of the substrate monolith, with substantially no overlap in layers between applications from the first and second ends of the substrate monolith. The resulting coating product is then dried, then calcined. The process can be repeated with a second washcoat coating component, to provide a catalysed (bi-layered) substrate monolith according to the invention. The resulting coated monolith substrate was coated with a washcoat of the second catalyst containing Pt salts followed by same drying and firing steps. The amounts and concentrations of the Pt and Pd salts used were calculated to result in a total platinum group metal loading (for the two layer construct) of 100 $gft^{-3}$ at a 2Pt:Pd ratio. The bottom layer comprised 33 $gft^{-3}$ Pd and 63 $gft^{-3}$ Pt and the top layer comprised 3 $gft^{-3}$ Pt. The finished catalyst was lean hydrothermally aged at 800° C. for 16 hours in 10% $H_2O$, 10% $O_2$, balance $N_2$.

A two-layer catalyst for use in the present invention was made using the same techniques used to make the Conventional two-layer catalyst and comprised a bottom layer comprising 2 $gin^{-3}$ of a 60:40 mixture by weight of $CeO_2$: $Al_2O_3$ and 45 $gft^{-3}$ platinum group metal in total at a 2Pt:Pd ratio and a top layer of 2 $gin^{-3}$ $Al_2O_3$ only supporting 45 $gft^{-3}$ total platinum group metal at 2Pt:Pd ratio (90 $gft^{-3}$ total platinum group metal loading). This catalyst was lean hydrothermally aged in a similar manner to the Conventional catalyst.

Example 2

Engine Testing of Fully Formulated DOC

The catalyst of Example 1 was fitted in a pre-existing close-coupled position (i.e. close to the engine exhaust manifold) to a 2.0 liter Diesel bench-mounted engine having an engine management system with a $NO_x$ trap engine calibration, i.e. the vehicle as sold is fitted with a $NO_x$ trap and $NO_x$ trap engine calibration. In our tests, the $NO_x$ trap was removed and replaced with a DOC. In a first run, the cumulative CO conversion of the lean hydrothermally aged DOC was tested over the European MVEG-B cycle and the exhaust gas composition was monitored both upstream and downstream of the DOC using an engine dynamometer. No "rich purge" occurred during the cycle, i.e. the engine management system did not switch to a condition adapted to remove and reduce $NO_x$ adsorbed on the catalyst. A "rich purge" is used to activate catalysts according to the invention and any rich purge effected during the tests would have made comparison of the results difficult.

Following the first run, the DOC was activated off-cycle. The activation used was done by overriding the engine management control to produce 4 cycles each of 30 seconds lean followed by 10 seconds rich.

The results are shown in FIGS. 1 and 2. In FIG. 1 it can be seen that the cumulative CO conversion for the Conventional DOC is substantially identical for both the lean hydrothermally aged ("before activation") and "after activation" MVEG-B runs. However, for the DOC according to the invention, the CO conversion is substantially improved. These results are also summarized in Table 1.

TABLE 1

| Activation | Conventional DOC | | Active DOC | |
| --- | --- | --- | --- | --- |
| | Before | After | Before | After |
| CO g/km | 0.50 | 0.50 | 0.63 | 0.13 |
| Activation Details | | 4 × (30 s lean/10 rich) | | |

Example 3

In-Cycle Activation of Fully Formulated DOC

An identical, lean-hydrothermally aged catalyst according to the invention was prepared as described in Example 1. This catalyst was fitted in the close-coupled position to a bench-mounted 2.0 liter Diesel engine different from the engine used in Example 2, but an engine that was also calibrated for $NO_x$ trap regeneration. The engine was run over the European MVEG-B emission cycle and the CO content of the exhaust gas both at engine-out and downstream of the catalyst was monitored using an engine dynamometer. The cumulative CO content of the exhaust gas is shown in the graph at FIG. 3, top left, with the top trace showing CO content in engine-out emissions. CO emissions for this first run were 1.04 g/km.

Following the first MVEG-B test cycle, a second test was run but in this cycle (shown in the graph at FIG. 4, top right) the engine conducted a $NO_x$ purge (or "activation") event of 8 seconds rich. A third MVEG-B test cycle was performed immediately after activation (see FIG. 4, bottom left-hand graph). It can be seen from this third graph that the cumulative CO conversion is improved over the first and second test cycles. The recorded CO emissions for the third cycle was 0.43 g/km.

From this Example 3 it can be seen that the catalyst for use in the present invention can be activated (and hence repeatedly reactivated) intermittently in use to maintain CO and hydrocarbon conversion at limited fuel penalty for each activation.

For the avoidance of any doubt, the entire contents of every patent document referenced herein is incorporated herein by reference.

The invention claimed is:

1. An apparatus comprising a lean-burn internal combustion engine, engine management means and an exhaust system for treating exhaust gas of the engine, which exhaust system comprising a first oxidation catalyst disposed on a first honeycomb monolith substrate, which first oxidation catalyst comprising platinum supported on a first metal oxide support comprising at least one reducible oxide and at least one molecular sieve, wherein the at least one molecular sieve comprises at least one precious metal and either (i) copper, (ii) iron, or (iii) copper and iron, wherein the first oxidation catalyst is substantially free of alkali metals and alkaline earth metals, wherein the engine management means is arranged, when in use, intermittently to modulate the lambda composition of the exhaust gas contacting the first oxidation catalyst to a rich lambda composition.

2. An apparatus according to claim 1, wherein the first oxidation catalyst disposed on the monolith substrate has a platinum group metal loading of >10 g/ft$^3$.

3. An apparatus according to claim 1, wherein the first oxidation catalyst comprises palladium supported on the first metal oxide support in combination with the platinum.

4. An apparatus according to claim 1, wherein the first oxidation catalyst is combined with a second oxidation catalyst different from the first oxidation catalyst, which second oxidation catalyst comprises at least one precious metal supported on a second metal oxide support.

5. An apparatus according to claim 1, wherein the first honeycomb monolith substrate, and, where present, a second honeycomb monolith substrate, is disposed upstream of a catalysed filter for filtering particulate matter from the exhaust gas.

6. An apparatus according to claim 1, wherein the at least one reducible oxide is selected from the group consisting of oxides, composite oxides and mixed oxides of one or more metal selected from the group consisting of manganese, iron, tin, copper, cobalt and cerium, and stabilised homologues thereof.

7. An apparatus according to claim 6, wherein the at least one reducible oxide comprises at least one of $MnO_2$, $Mn_2O_3$, $Fe_2O_3$, $SnO_2$, CuO, CoO and $CeO_2$.

8. An apparatus according to claim 6, wherein the stabilised homologue of $CeO_2$ comprises zirconia, at least one non-cerium rare earth oxide or both zirconia and at least one non-cerium rare earth oxide.

9. An apparatus according to claim 6, wherein the first metal oxide support consists essentially of bulk at least one reducible oxide or stabilised homologues thereof.

10. An apparatus according to claim 6, wherein the at least one reducible oxide or stabilised homologue thereof is supported on the first metal oxide support with the platinum.

11. An apparatus according to claim 1, wherein the first honeycomb monolith substrate is disposed upstream of a monolith substrate comprising a catalyst for selectively reducing oxides of nitrogen using a nitrogenous reductant.

12. An apparatus according to claim 11, wherein the monolith substrate is a flow-through monolith substrate.

13. A method of recovering an oxidation activity of a first oxidation catalyst aged in an exhaust gas of a lean-burn internal combustion engine, which first oxidation catalyst comprising platinum supported on a first metal oxide support and disposed on a honeycomb monolith substrate, which method comprising the step of intermittently contacting the first oxidation catalyst with exhaust gas modulated to a rich lambda composition, wherein the first metal oxide support comprises at least one reducible oxide and at least one molecular sieve, wherein the at least one molecular sieve comprises at least one precious metal and either (i) copper, (ii) iron, or (iii) copper and iron, and wherein the first oxidation catalyst is substantially free of alkali metals and alkaline earth metals.

* * * * *